US007512840B2

(12) United States Patent
Martin et al.

(10) Patent No.: US 7,512,840 B2
(45) Date of Patent: Mar. 31, 2009

(54) SYSTEM AND METHOD FOR PROVIDING GRAPHICAL REPRESENTATION AND DEVELOPMENT OF A PROCESSING APPLICATION

(75) Inventors: Maurice Martin, San Francisco, CA (US); Guillaume Lebleu, San Francisco, CA (US)

(73) Assignee: Diebold, Incorporated, North Canton, OH (US)

( * ) Notice: Subject to any disclaimer, the term of this patent is extended or adjusted under 35 U.S.C. 154(b) by 417 days.

(21) Appl. No.: 11/238,800

(22) Filed: Sep. 29, 2005

(65) Prior Publication Data
US 2006/0075387 A1 Apr. 6, 2006

Related U.S. Application Data

(60) Provisional application No. 60/615,172, filed on Oct. 1, 2004.

(51) Int. Cl.
*G06F 11/00* (2006.01)
(52) U.S. Cl. .......................................... 714/38; 717/124
(58) Field of Classification Search ................... 714/38, 714/37, 4; 717/110, 124, 125, 126; 715/513
See application file for complete search history.

(56) References Cited

U.S. PATENT DOCUMENTS 6,915,523 B2 * 7/2005 Dong et al. .................. 719/319
2002/0108101 A1 * 8/2002 Charisius et al. ............ 717/105
2004/0006744 A1 * 1/2004 Jones et al. .................. 714/514
2004/0194057 A1 * 9/2004 Schulte et al. ............... 717/114
2004/0226002 A1 * 11/2004 Larcheveque et al. ....... 717/126
2004/0230909 A1 * 11/2004 Browne et al. .............. 715/700

\* cited by examiner

*Primary Examiner*—Dieu-Minh Le
(74) *Attorney, Agent, or Firm*—Crowell & Moring LLP

(57) ABSTRACT

A system and methods are provided for operating and building graphically XML processing programs, guiding the user in development of the program, preventing and detecting development errors as the program is being designed, ensuring that the program is valid, i.e. satisfies required input and output constraints at all times, i.e. from the time it is developed to when it is deployed in a production environment, ensuring the automated change management if the internal logic of the Web service, or data sources called by the service or the schema that underlies the Web service are modified. The system includes a graphical XML Programming system where XML processing programs are built and represented in a graphical fashion, a real-time metadata computation and visualization method for each selected execution point in the visual program that provides guided programming, error prevention and detection, and change impact analysis and change management, and, an automated execution path exploration method that enables overall program validation and error identification. The system and methods allow a user to reduce by at least a factor of 2 the costs of development and maintenance of reliable XML processing programs such as Web Services.

111 Claims, 8 Drawing Sheets

Apparatus 1: visual representation and editing of an XML processing program that provides XML type inference to avoid programming errors, detect errors, and validate programs according to their expected XML output type

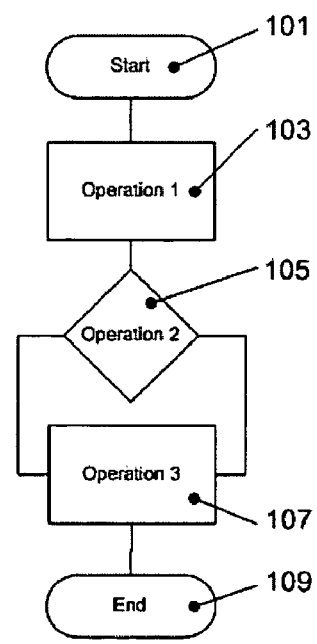

```
<ACORD> [1]
  <SignonRq> [0..1]
    <SignonPswd> [1]
      <SignonRoleCd> Enumeration [0..1]
      <CustId>
        <SPName> String [1]
        @id=" String " [0..1]
        <CustPermId> String [0..1]
        <CustLoginId> String [0..1]
      </CustId>
      ...
    </SignonPswd>
  </SignonRq>
</ACORD>
```

FIGURE 1

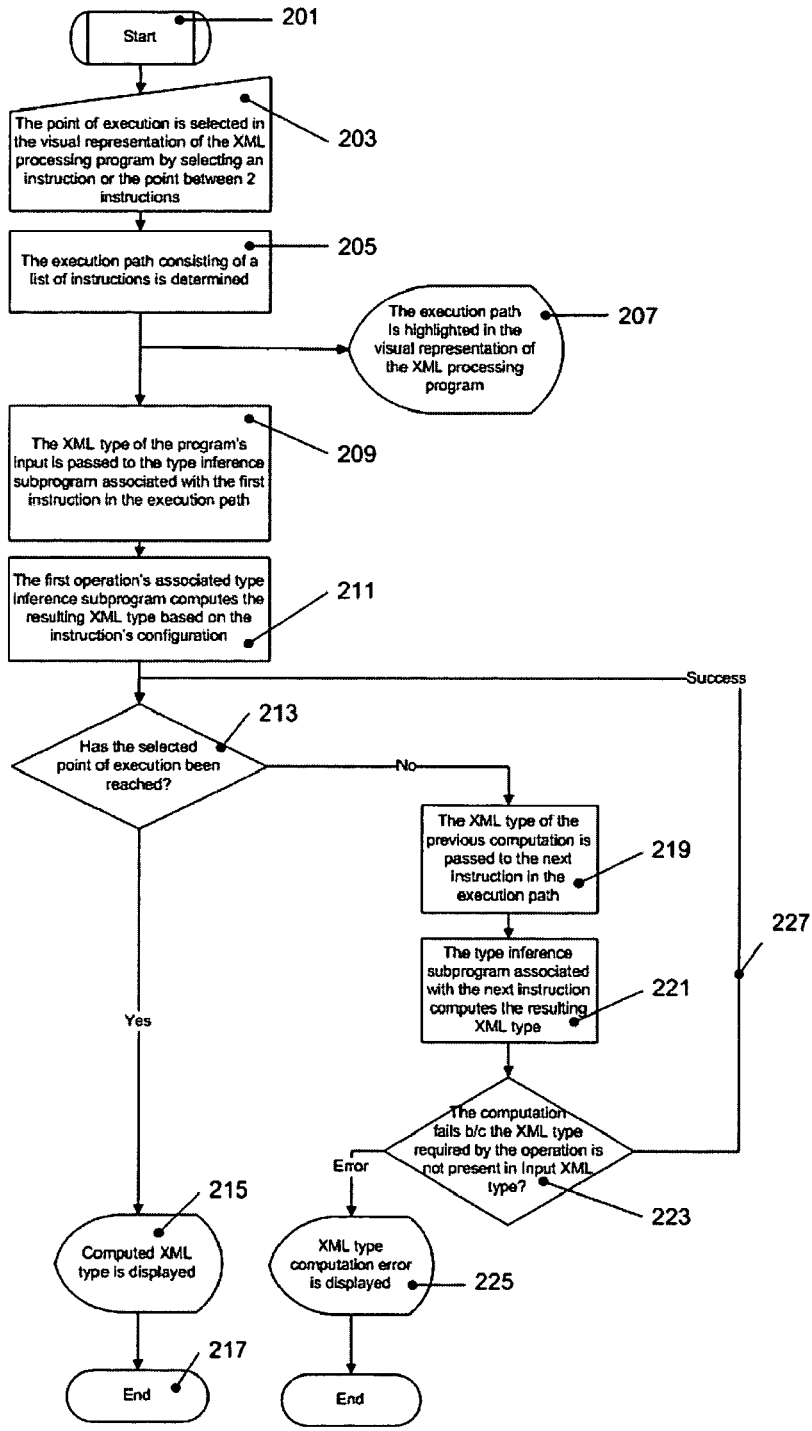

```
Metadata Inspector
| Scenario Input | Scenario Output | Variables |

- <BalInqRq> [1]
    <RqUID> UUID value </RqUID> [1]
  + <MsgRqHdr> [0..1]
    <AsyncRqUID> UUID value </AsyncRqUID> [0..1]
    <CustId> String value </CustId> [0..1]
  + <DepAcctId> [1]
  - <CardAcctId> [1]
        <AcctId> String value </AcctId> [1]
     + <CardMagData> [1]
        <AcctType> String value </AcctType> [1]
        + <CCMotoAcct> [0..1]
    </CardAcctId>
  + <LoanAcctId> [1]
    <IncExtBal> IFXboolean value </IncExtBal> [0..1]
    <DeliveryMethod> String value </DeliveryMethod> [0..1]
  </BalInqRq>
```

FIGURE 8

SYSTEM AND METHOD FOR PROVIDING GRAPHICAL REPRESENTATION AND DEVELOPMENT OF A PROCESSING APPLICATION

RELATED APPLICATIONS

This application claims priority based on U.S. Provisional Application No. 60/615,172, filed on Oct. 01, 2004.

BACKGROUND

The National Institute of Standards and Technology ("NIST") in 2002 released a report stating that software errors cost the U.S. economy $59.5 billion per year. As Web Services i.e. software receiving XML messages, processing them and returning XML messages, and can be also called (activity services, entity services, process services, business services, etc.) are quickly becoming the de facto standard software component model and will be created by the thousands, a skyrocketing portion of this cost will be related to Web Services and XML processing software. This NIST study found more than a third of that expense could be eliminated by improved testing that enables earlier and more effective identification and removal of defects. However, being able to do so, requires a completely new approach, the use of different programming technologies and languages, The scalable deployment of Web services mandates a technology that ensures the correctness of Web services at the development time and enables the automated change management of those services.

Today, the development paradigm for application development is object-oriented and is not adapted to the creation of this myriad of mini-applications called Web Services that are structurally defined as XML entities. The industry is currently applying its object oriented languages to Web Services. This is a mismatch.

Languages such as Java or NET C# are object-oriented. Objects contain data and methods. The behavior of the object is encoded inside the object as methods. The level of constraints expressed in an object is simple in terms of the data but can be extremely complex in terms of methods. To some extent this is because Java and NET C# are general languages for general needs, but not for all needs.

MS VS [Microsoft Visual Studio] and Eclipse both provide an "Intellisense" or "Intellisense-like" feature to help developers working in objected oriented languages. If, for instance, a developer types "custInfo." and if custInfo is an object of type Customer info, then both environments displays a popup-menu listing the fields and methods of the Customer info class. This type-looking is based on static typing and is eventually nothing more than a dictionary lookup algorithm.

MS VS and Eclipse (using an underlying compiler, e.g. Javac) also provide the minimal checking (parsing errors, warning, . . . ) that developers expect from such studios. This checking can be performed at compilation time or in background depending on the product and speed of the machine one uses.

However, MS VS and Eclipse are incapable of certifying that a program is logically valid, that it follows constraints and that it will not have run time errors. As a result, the quality of a program entirely depends on human factors, which means that a program is largely unreliable. For example, the developer has to check for null references, unutilized variables, correctness of the input parameters and other fatal errors. For all these aspects and multiple others, the quality of the program relies on the quality and experience of the developers and oversights are extremely frequent.

In other words, with general object-based languages, there is no way to know, at design time that a program will not generate an unmanaged exception and/or crash with a run time error.

Hence the necessity, with object oriented languages, to address the following issues:
Write test code while writing the code (extreme programming).
Follow good QA process to test the program.
Effectively use debugger Tools.
Employ good Technical and Customers services for addressing issues not detected during the QA phase.

As an illustrative example, consider the development of a Web Service that processes an Account Balance Inquiry request that complies with the IFX 1.4.0 specification (BalInqRq message), and returns an Account Balance Inquiry Response (BalInqRs). The BalInqRq and BalInqRs are XML-based messages and are formally defined in the IFX 1.4.0 XML Schema. A fragment of this schema is as follows:

```
<xsd:element name="BalInqRq" type="BalInqRq_Type">
</xsd:element>
<xsd:complexType name="BalInqRq_Type">
    <xsd:sequence>
        <xsd:element ref="RqUID"/>
        <xsd:element ref="MsgRqHdr" minOccurs="0"/>
        <xsd:element ref="AsyncRqUID" minOccurs="0"/>
        <xsd:element ref="CustId" minOccurs="0"/>
        <xsd:choice>
            <xsd:element ref="DepAcctId"/>
            <xsd:element ref="CardAcctId"/>
            <xsd:element ref="LoanAcctId"/>
        </xsd:choice>
        <xsd:element ref="IncExtBal" minOccurs="0"/>
        <xsd:element ref="DeliveryMethod" minOccurs="0"/>
    </xsd:sequence>
</xsd:complexType>
```

What this means is that any BalInqRq message will start with a BalInqRq tag, which will contain:
a mandatory RqUID element,
an optional MsgRqHdr element (2 possible cases),
an optional AsyncRqUID element (2 possible cases),
an optional CustId element (2 possible cases),
then either a DepAcctId element or a CardAcctId element or LoanAcctId, but
not any 2 at the same time (3 possible cases),
and then an optional IncExtBal element (2 possible cases),
and finally an optional DeliveryMethod element (2 possible cases).

Given this interface definition, and without even dealing with particular values when elements are present or showing the definitions of elements like CardAcctId, which may itself contain optional elements, choices, etc., we would in theory already require 2×2×2×3×2×2=96 test cases to cover the different possibilities.

This is an example of a valid BalInqRq:

```
<BalInqRq>
    <RqUID>f81d4fae-7dec-11d0-a765-00a0c91e6bfb</RqUID>
    <MsgRqHdr>
        <NetworkTrnInfo>
            <NetworkOwner>ATM</NetworkOwner>
            <TerminalId>22222</TerminalId>
```

-continued

```
        <BankId>10255000017</BankId>
        <PostAddr>
            <Addr1>93 Dalma Drive</Addr1>
                <City>Mountain View</City>
                <StateProv>CA</StateProv>
            <PostalCode>94041</PostalCode>
            <Country>US</Country>
        </PostAddr>
    </NetworkTrnInfo>
    <MsgAuthCode>
        <MacValue>1234</MacValue>
    </MsgAuthCode>
</MsgRqHdr>
<CardAcctId>
    <CardMagData>
        <MagDat2>;123456102132547692=0212</MagDat2>
    </CardMagData>
    <AcctType>DDA</AcctType>
</CardAcctId>
</BalInqRq>
```

With this one example, the case is tested where there is a MsgRqHdr, a CardAcctId, but no AsyncRqUID, CustId, IncExtBal or DeliveryMethod. In theory, a developer would need ninety five more test cases.

Furthermore, because a Web Service is defined not just by input XML Schema fragment(s), but also by output XML Schema fragment(s), any XML output resulting from testing must also be tested for compliance with the output XML Schema fragment(s).

When a test case either produces a runtime error or an XML output that does not comply with the XML Schema, the program must be modified. Any such modification may create new problems.

The main reason for this time consuming approach stems from the inability of languages like Java, C or C# to perform static type checking at compile time based on a type system that conforms to the XML Schema specification. For instance, in a Java program that manipulates XML instances of the previous XML Schema example, even though CardAcctId and LoanAcctId are mutually exclusive tags, there is nothing that will technically prevent the developer from making a mistake such as trying in to copy the content of CardAcctId while having already positively tested that the LoanAcctId exists.

Therefore, there exists a need for a system and methods that serve to prevent a developer from making such mistakes, detecting errors resulting from changes in the program, and ensuring overall program validity, without relying on extensive case-based testing. As will be seen, the invention enables such a system and method in an elegant manner.

SUMMARY OF THE INVENTION

These challenges are obviated by the methods and systems described herein. These methods and systems are document-oriented rather than object-oriented.

Document-oriented Web services refer to Web services whose methods are implicitly assumed and not expressed in the XML schemas. For example, the purpose of industry standards schema such as IFX, ACORD or OTA is to express complex data-structures with a rich set of constraints that will be exchanged through a typical request/response exchange.

Document-oriented Web services contrast with RPC-Style Web services where XML is merely used to express methods and their parameters usually using simple XML types mapped to the data types existing in the language being used, e.g. Java or C#.

As of today, development environments for Java or C# provide tools such as Microsoft XSD.EXE which enable developers to create XML schemas from Classes or Classes from XML schemas. These tools bare well with RPC-style Web Services but fail miserably with document-oriented Web services because most of the constraints expressed in the XML schemas get lost in translation during the back-and-forth transformation between XML fragments and objects.

By adopting a document-oriented Web services approach, the role of XML is reversed (compared to the RPC-based used of XML) and finally becomes the role it was originally intended for. Instead of using XML as a mere transport of data parameters between two object-oriented end points that are parts of a Web Service exchange (RPC), the systems and methods described herein consist in a procedural-based language that executes on top of XML schemas and that is subjected to all the constraints expressed in these schemas. Hence the XML schema becomes the central intelligence of the Web service exchange. This central intelligence is expressed and enforced by the systems and methods described herein.

With the methods and systems described herein, the process of designing web services is radically different. First, as pointed out earlier, the language is constrained by the schema(s) used in a project. If, for instance, a sequence element can contain from 0 to 5 elements, the methods and systems described herein will automatically enforce that constraint. Using Java or NET C# a developer must explicitly write code to enforce and check such a property of the data.

Secondly, type checking within general languages such as Java and .NET is dynamic, not static. With languages such as Java or C#, the only way to make sure that a produced XML message is valid against an XML type defined within an XML schema is to use a validating parser. A validating parser is a program that takes an XML document and an XML schema as input. A validating parser can only be invoked at runtime, once a sample XML document is available. This kind of runtime-only type checking is called dynamic type checking. The system and methods described herein perform static type checking at design time, guarantying that XML data, both input and output, conform to the constraints expressed by the XML schema fragment used by the Web service no matter the number and types of the operations that will be executed between the reception of the input and the sending of the output. Although it is true that static type checking is available with Java or C# for classes (objects), it is not available for XML types (XML schema fragment). With the system and methods described herein, a developer is implicitly constrained to respect and conform to the constraints expressed in the schema(s). With Java, C# or other general languages, the developer has to explicitly write customized code to achieve the same results. The system and methods described herein provide therefore not only a 100% guaranty that the web service is free of interface bugs in terms of input and output but also significantly accelerates the creation of web services based on complex XML schemas.

Third, contrary to general languages where the range of possibility is "infinite",the system and methods described herein provide a specific language and environment which allows the automatic exploration of all the execution paths of a program.

In this way:

Types are inferred, not declared.

Type hierarchy (sub-typing) is based on the description of the type, not its name.

In other words, we know that a type <a> <b> String [0 . . . 1] </b> </a> is a subtype of <a> <b> String [1] </b> </a> not because they have the same name, but because the first one is a sub-case of the second one. Using mathematical sets, we would say that any instance of String [0. . . 1] is a sub-set of String [1] (because the empty set and the String[1] set are both included in the String[1] set).

- Types are defined as constraint sets, not as names. With this, it is possible to capture a lot more information about the kinds of values a given variable may be holding.
- Types are referring to XML types, not object types (classes)

Thus, with the systems and methods described herein, a developer knows at design time that her or his program will not fail or crash at runtime because the studio (the GUI application, part of the systems and methods described herein) already went through a complete analysis of the execution paths during the design and helps the developer fix errors at design time. Most of the design errors have been eliminated even before the web service is run for the first time.

THE FIGURES

FIG. 1 is a flow chart illustrating a visual representation and editing of an XML processing program that provides XML type inference to avoid programming errors, to detect errors, and to validate programs according to their expected XML output type.

FIG. 2 illustrates a flow chart for XML type inference at a given point of execution of an XML processing program.

FIG. 8 illustrates the output of an Metadata inspector.

DETAILED DESCRIPTION

Figure 3:
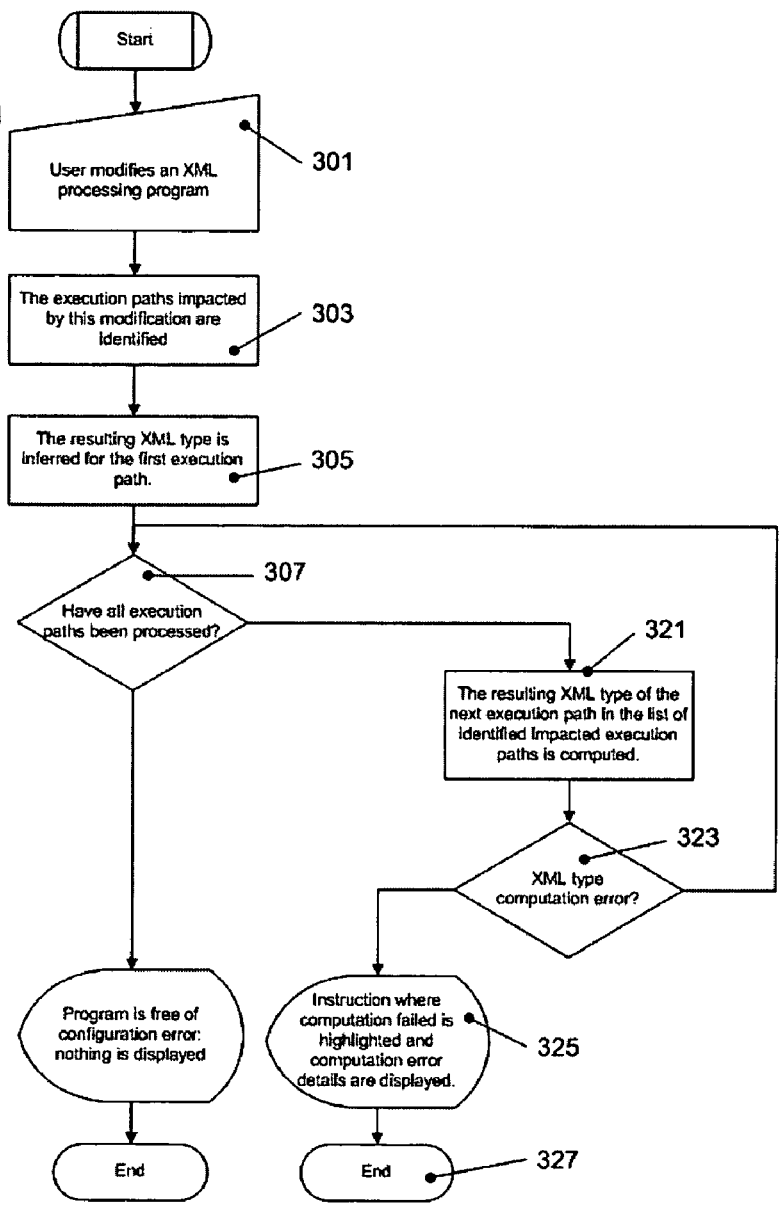
FIG. 3 illustrates a flow chart for instruction configuration error detection in an XML processing program based on XML type inference.

The invention leverages extensively the metadata available from the interface definition of the processing program, such as a Web Service, to prevent and detect many errors while the processing logic is being developed. It also automates change management whenever anything is modified in the Web service for whatever reason (internal logic, changes in any data source used by the Web service, or in the schema(s) that supports the Web service). The systems and methods described herein accomplish this at development time, by dynamically computing the metadata of the consumed and produced messages in each execution path and at each execution point of the processing logic.

Accordingly, a system and method are provided for establishing and maintaining a Visual XML programming environment where the program's XML processing logic is automatically computed and graphically visualized, and where metadata of XML instances processed at runtime is computed in real-time for each execution point in the program, so as to provide guided programming, error prevention, error detection and program validation. The system and method allow a configured system to reduce the costs of development and maintenance of message processing applications through dynamic execution path analysis.

The method and system described herein is document-oriented. Schema contains data structures that include a very rich set of constraints (in comparison to objects). The behavior of a web service based on our invention resides in the procedural-language based language that the method and system puts on top of schemas. The language is therefore constrained by the schema in comparison to Java and .NET C# where the language has almost no constraints and no constraints at all related to the syntactic and semantic validation of the Web service.

With the method and system described herein, the process of designing web services is radically different. First, as pointed out earlier, the language is constrained by the schema(s) used in a project. If, for instance, a sequence element can contain from zero to five elements, the method and system described herein will automatically enforce that constraint. With Java or .NET C# a developer must explicitly write code to constrain and check that feature. Second, type checking as described herein is dynamic, not static.

With languages such as Java or C#, the only way to make sure that a produced XML message is valid against an XML type defined within an XML schema is to use a validating parser. A validating parser is a program that takes an XML document and an XML schema as input. A validating parser can only be invoked at runtime, once a sample XML document is available. This kind of runtime-only type checking is called dynamic type checking. The system and methods described herein perform dynamic type checking at design time, guarantying that XML data, both input and output, conform to the constraints expressed by the XML schema fragment used by the Web service no matter the number and types of the operations that will be executed between the reception of the input and the sending of the output. Of course, static type checking is available with Java or C# for classes (objects) but not for XML types (XML schema fragment). With the system and methods described herein, a developer is implicitly constrained to respect and conform to the constraints expressed in the schema(s). With Java, C# or other general languages, the developer has to explicitly write customized code to achieve the same results. The system and methods described herein provide therefore not only a 100% guaranty that the web service is free of interface bugs in terms of input and output but also significantly accelerates the creation of web services based on complex XML schemas.

Third, contrary to general languages where the range of possibility is inherently limitless, the method and system described herein has designed a specific language and environment which allows the automatic exploration of all the execution paths of a program.

As described herein:
- Types are inferred, not declared.
- Type hierarchy (sub-typing) is based on the description of the type, not its name.

In other words, we know that a type <a> <b> String [0 . . . 1] </b> </a> is a subtype of <a> <b> String [1] </b> </a> not because they have the same name, but because the first one is a sub-case of the second one. Using mathematical sets, we would say that any instance of String [0. . . 1] is a sub-set of String [1] (because the empty set and the String[1] set are both included in the String[1] set).

- Types are defined as constraint sets, not as names. With this, it is possible to capture a lot more information about the kinds of values a given variable may be holding.

Types are referring to XML types, not object types (classes)

Thus, with the systems and methods described herein, a developer knows at design time that her or his program will not fail or crash at runtime because the studio (the GUI application part of the systems and methods described herein) already went through a complete analysis of the execution paths during the design and helps the developer fix errors at design time. Most of the design errors have been eliminated even before the web service is run for the first time.

In operation, the metadata of the input and output is defined in a standardized language. The system enables dynamic execution path analysis during development, helping a developer's awareness of the program under development in real time. During development, the system computes the updated input and output metadata in each of the execution paths of the scenario's processing logic and prevents the user from producing errors. At each stage, from the beginning of operation, the state of the metadata is analyzed at the input as well as the output.

For example, the system may prevent a developer from attempting to manipulate or copy an element that will not be available at runtime in a particular execution path. The invention provides a user interface that illustrates the output metadata. If highlighted, the given path of execution and point of execution could be considered as existing. This is particularly useful in preventing errors, where the user is able to visualize exactly for each execution path the status the construction of the input and output, and to determine whether predetermined constraints are satisfied. The operation provides to a developer a system that provides guided programming, error prevention, error detection and program validation.

FIG. 1 is a flow chart illustrating a visual representation and editing of an XML processing program that provides XML type inference to avoid programming errors, to detect errors, and to validate programs according to their expected XML output type. The process begins at "START" 101 with "OPERATION 1" 103 to a decision point at "OPERATION 2" 105, continuing to "OPERATION 3" 107 with the processing ending at "END" 109.

FIG. 2 illustrates a flow chart for XML type inference at a given point of execution of an XML processing program. The process begins at "Start" 201 and the first step is selecting a point of execution in the visual representation of the XML processing program 203, 205. This is done by selecting an instruction on the point between two instructions. The execution path, consisting of a list of instructions, is determined. The execution path is highlighted in the visual representation of the XML processing program In the next two blocks the XML type of the program's input is passed to the type inference subprogram associated with the first instruction in the execution path 209, and the first operation's associated type inference subprogram computes the resulting XML type based on the instruction's configuration 211. If the selected point of execution has been reached 213 the computed XML type is displayed 215 and the program ends 217. Otherwise the XML type of the previous computation is passed to the next instruction in the execution path and the type inference subprogram 219 associated with the next instruction computes the resulting XML type 221. If the computation fails because the XML type required by the operation is not present in the input XML 223, an error is determined 225. Otherwise controlled is returned 227.

If the selected point of the execution has not been reached, the XML type is passed to the next instruction and the type inference subprogram computes the resulting XML type.

FIG. 3 illustrates a flow chart for instruction configuration error detection in an XML processing program based on XML type inference. This flow chart illustrates the case where the user modifies the source 301, the execution paths impacted by the changes are identified 303, and the resulting XML type is inferred 305. If all of the execution points have been processed 307 and there is no error 309 the program exits 311. Otherwise execution continues, until the point of the computation is determined 321. If there is a computation error 323 the instruction occurred is highlighted and computation errors are displayed 325 and the program exits 327.

Figure 4:
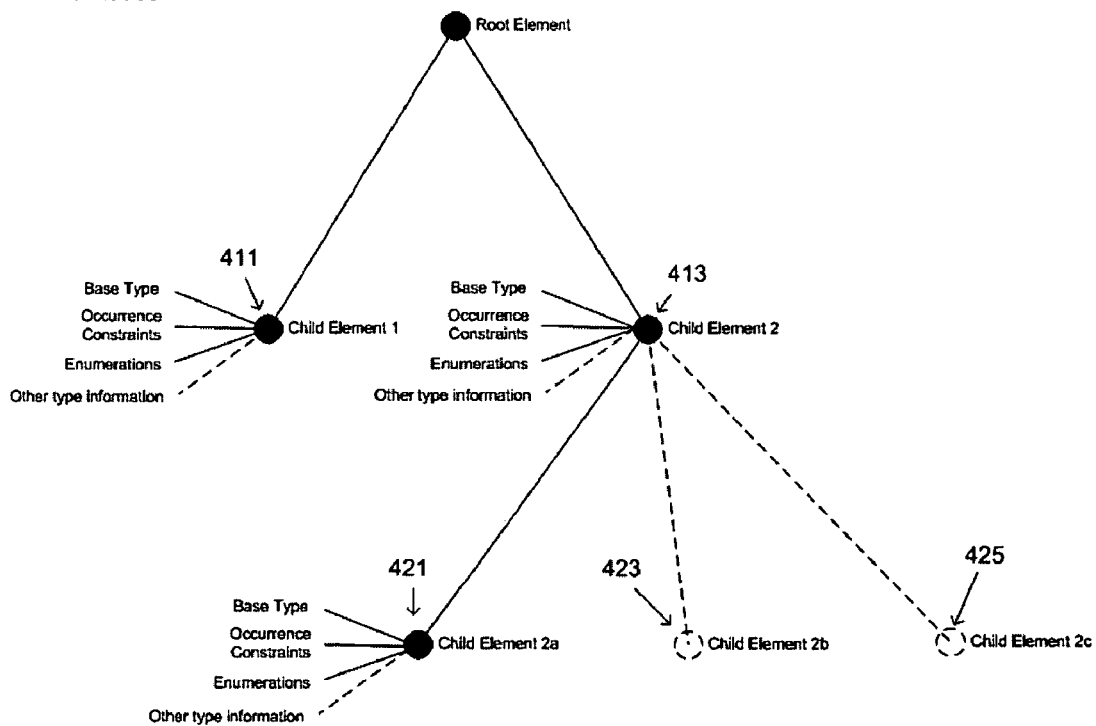
FIG. 4 illustrates a representation of XML types as annotated trees of nodes.

FIG. 4 illustrates a representation of XML types as annotated trees of nodes, e.g., a root element 401, child elements 411 and 413, defined by base type, occurrence constraints, enumerations, and other type information. Child element 413 is shown with a further generation of child elements 421, 423, and 425.

Figure 5:
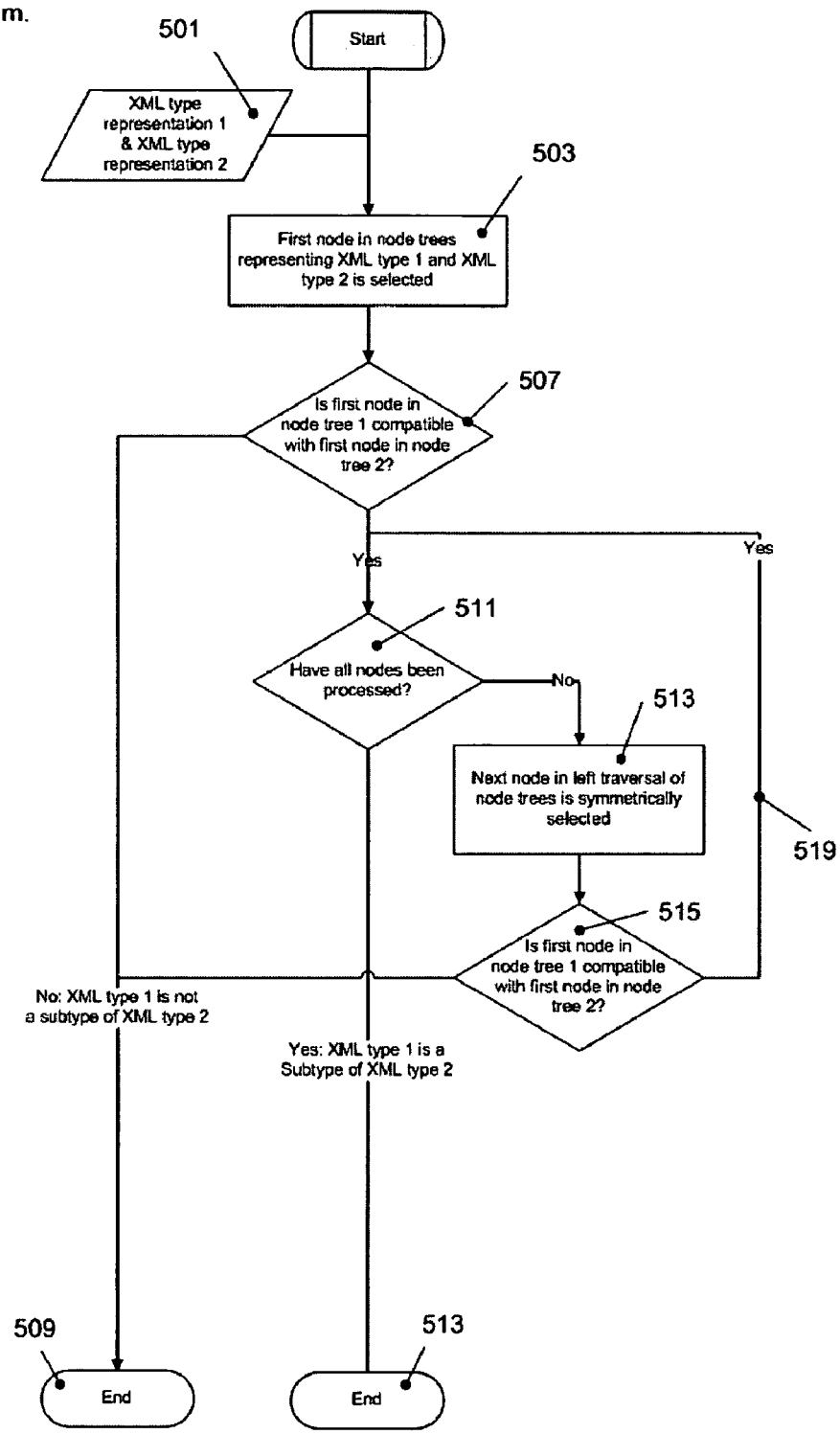
FIG. 5 illustrates a flow chart for XML subtyping algorithm.

FIG. 5 illustrates a flow chart for XML sub-typing algorithm. As shown in FIG. 5 the process starts with XML type representation 1 and XML type representation 2, 501, where the first node in a node tree, representing types 1 and 2 is selected 503. The nodes are tested for compatibility 505, and if not compatible the program exits 511. If the nodes are compatible and all nodes have been processed 509 the program ends 513. If all of the nodes have not been processed, a next node is processed 513, and the node is tested for compatibility 515. Control returns to return to the determination of if the node is the last node 519.

Figure 6:
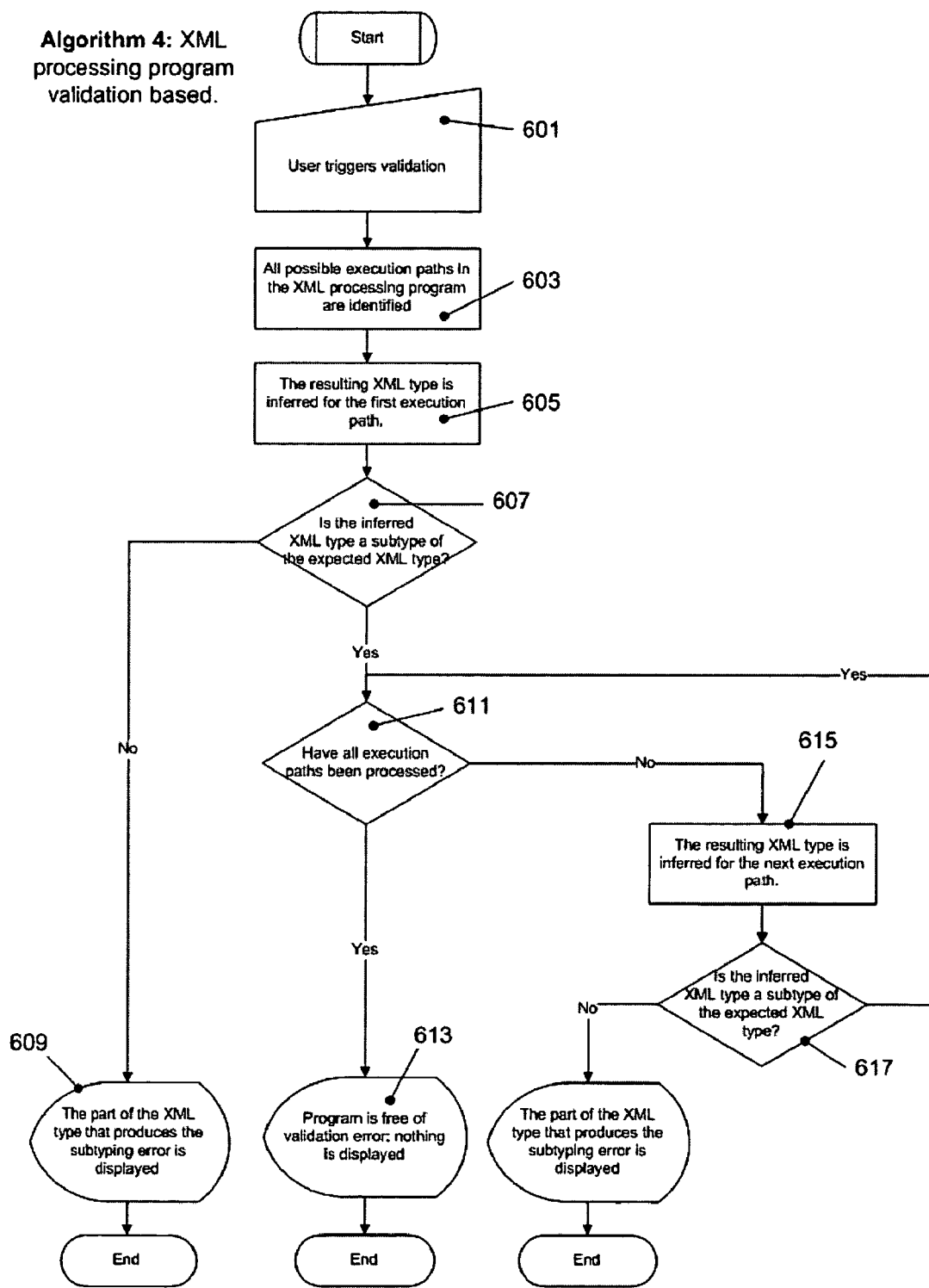
FIG. 6 illustrates a flow chart for XML validation based processing program.

FIG. 6 illustrates a flow chart for XML validation based processing program.

The process starts with the user triggering validation 601, with all possible paths in the XML processing program being identified 603. The resulting XML type is inferred for the first execution path 605.

If the inferred XML type is not a subtype of the expected XML type 607, he part of the XML type that produced an error message is identified and displayed 609. Otherwise, with no validation errors, and all execution paths processed 611, the program is deemed to be free of validation errors 613.

If all of the execution paths have not been processed 611, the resulting XML type is inferred for the next execution point 615. If the inferred XML type is a subtype of the expected XML type 617 the next node is type checked. Otherwise the part of the XML type that produced the sub-typing error is detected and displayed 619.

Another embodiment of the invention provides a computer programming system that includes a programming language and its interactive visual representation as a graphical flowchart. The graph's edges corresponding to execution specific paths and points of the program can be visually selected to either add new processing nodes, or display at a given point in a given path the metadata of the variables of the program. The system includes a metadata computation module configured to compute the metadata of the variables available and/or expected at any given point and path of a program, given a program in this language, the metadata of this program's input and output, and an execution path and point in this program, thus enabling guided development. The system also includes a set of configuration panels for each possible type of processing node. The panels leverage the computed metadata and its visual representation at the execution point where the node is added, to enable point and click configuration of the processing node and to prevent the users from selecting as parameters of the processing node, variables that do not exist or whose type is not compatible with the processing node's parameters type, thus preventing errors.

The system further includes a processing node configuration error visual notification module. In operation, this module enables a processing node to be instantly visually highlighted if a processing node's configuration is or becomes incorrect. This may be either because its parameters use variables that do not exist or do not have the required type in a given execution path, thus enabling error detection as the program is being designed. The system further includes a program validation module that explores all execution paths, computes the resulting metadata for each possible execution path, and validates that it is consistent with the program's output metadata, and if not notifies the user through a list execution paths and points where errors were found, thus enabling overall program validation and accelerating trouble shooting.

One of the advantages of XML is that it enables a standardized language for metadata: XML Schema. Most XML data interchange specifications are or will be available in this language (even WSDL, the Web Services interface Description Language is based on this language).

Figure 7:
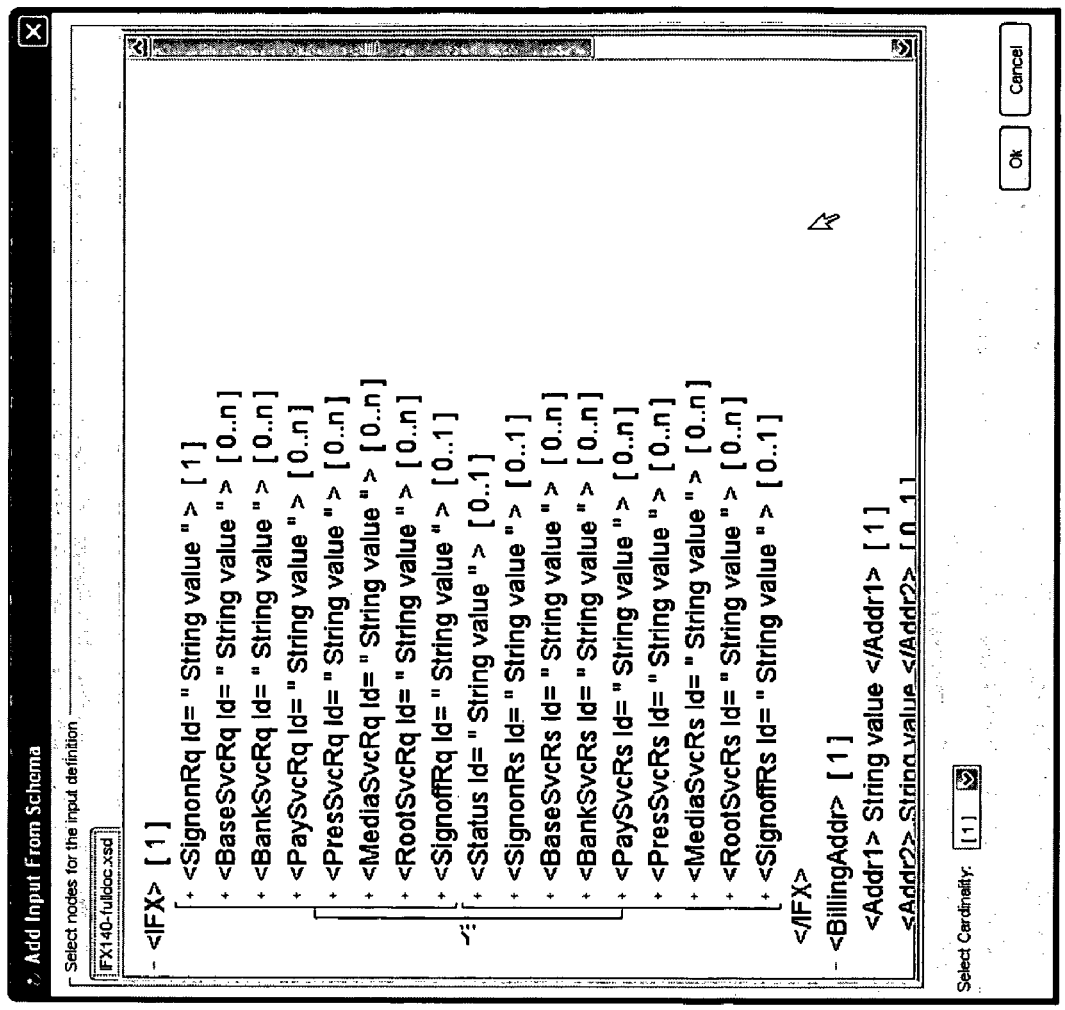
FIG. 7 illustrates an output message of the systems and methods of the invention.

In a system configured according to the invention, the first step before developing any XML processing logic is to define the metadata of the input and the metadata of the output of the program, called a scenario, in technical jargon. The definition of the input and output is done by visually selecting a node from the previously loaded XML Schemas or WSDL. In our example, we load the IFX 1.4.0 XML Schema and configure with a point-and-click interface the consumed input message and produced output message of our processing scenario as shown in FIG. 7.

After configuration is done, the system produces the representation, as shown in FIG. 8, showing a representation of a Metadata Inspector.

First, this is with no doubt a much more readable version of the original XML Schema shown earlier. We actually get even more information: we know now that the element RqUID is of type UUID, that CardAcctId is actually a complex element that may contain either a AcctId or a CardMagData element, etc.

What we can notice is that this scenario has a beginning, an end, one execution path and one execution point within that execution path. This execution path is actually in dark blue meaning that it has been selected by user, and the input metadata we have shown is actually the state of the metadata of the input in this particular execution path and point. We could also look at the state of the metadata of the output in this particular execution path:

The metadata may be in a contrasting color or tone. This indicates that this is the expected metadata of the produced message, whereas in the case of the input, it is the actual metadata of the message received.

In a system configured according to the invention, XML processing programs, also called "scenarios", are designed by adding processing operations to an execution point.

By way of embodiment and exemplification, we are going to add three simple operations to our scenario and see the consequence on metadata in different execution paths:

An operation that creates the BalInqRs element in the output.
An operation that tests if the MsgRqHdr element exists in the BalInqRq request message, and if so, will copy the content of MsgRqHdr to the output.
An operation that switches based on what type of AcctId (Card, Dep or Loan) is used in the MsgRqHdr.

In such a scenario, we can see that we have now six execution paths (two with the exists/does not exist switch and three in the Id/CardAcctId/LoanAcctId switch) and eight execution points. For each execution point, it is possible to visualize the metadata.

According to the invention, three different configurable colors are used to differentiate the unselected execution paths (for example light grey), the selected execution path (for example, blue) and the execution point within that execution path (for example, dark blue).

Looking at the arrow, we can see that we have still selected the main path of execution, but within that path, we have selected to view the state of the metadata after the operation "Create BalInqRq", which creates the element BalInqRs in the output. FIG. 6 shows the state of the metadata of the output after this operation:

We can see that in the output metadata, the BalInqRs element has changed color, which means that for this given path of execution and point of execution, the user can consider it is "there". This is particularly useful since the user is able to visualize exactly for each execution path where he stands in the construction of the output, and see if the constraints are satisfied. This is powerful in helping the user to avoid errors.

Preventing errors

If we select the "exists" branch of the "If MsgRqHdr exists" operation, we can see that the actual cardinality of the MsgRqHdr element has turned from [0. . . 1] (i.e., present or not present) to [1] (present). If we select the "does not exist" branch of the "If MsgRqHdr exists" operation, we see that we can't see anymore the element MsgRqHdr in the input metadata! Well, that could be expected since we just asserted it does not exist.

By computing the updated input and output metadata in each of the execution paths and points of the scenario's processing logic, the invention prevents the user to produce errors like trying to manipulate or copy an element that will not be available at runtime in a particular execution path.

Similarly, we can see that in each branch of the "Switch" operation, the choice icon has disappeared and only the relevant AcctId type is available:

According to the invention, the configuration of operations such as, for example, copy, move, mathematical expression, and other operations, are configured using the computed metadata at the execution point where the operation is added.

For instance, if the user wants to add a copy operation at a particular point of execution, he has first to right-click on the execution point, and then selects the operation to add (for instance, a copy operation).

Then, a configuration panel pops up. All configuration panels are specific to the operation's functionality, but all of them leverage the computed metadata for point & Click configuration. For instance, for the Copy operation, the user can select what to copy under the "Origin" tab of the operation's configuration panel (see figure below), and where to copy it, under the "Destination" tab of the configuration panel, just by pointing and clicking.

This makes it substantially impossible for the user to select by mistake an element that would not be "there" at run time. In this case, the user would not be able to copy a CartAcctId or LoanAcctId). This is a powerful way to decrease the risk of potential errors and associated required testing. Here is an example of the configuration panel of an operation that we add to the CardAcctId branch, as you can see it is impossible to configure the "origin" (i.e. what is been copied) with an element like CardAcctId or DepAcctId that may not be there at runtime:

Change Management Through Automated Error Detection

One of the many other benefits of real-time computed metadata throughout its development environment is the ability to detect errors as changes are made to the XML processing logic, the Web services definition or the definition of the resources accessed.

Consider the case where we modify our example scenario to support another version of IFX, for instance the IFX 1.3.0 XML Schema. We can quickly change the configuration of the scenario to use the BalInqRq/Rs definition provided in IFX 1.3.0 instead of IFX 1.4.0. After we apply changes we get the following:

FIG. 8 shows, the "If MsgRqHdr" operation is highlighted in a contrasting color, indicating that the upgrade to the new version of the schema makes this operation invalid. The reason is that in the IFX 1.3.0 XML Schema the MsgRqHdr element does not exist, but one of the operations in the scenario makes use of it, which results in an operation not being properly configured in this new context. The invention is able to automatically detect configuration errors and highlight them using another color, for example, red. According to the invention, a configured system is capable of identifying which operation makes use of this element and highlights it, for example, in red. If we look at the configuration of the "If MsgRqHdr exists" operation, we get the following error message:

We are then able to take the necessary action (in this case, suppressing the "If MsgRqHdr exists" operation) so that our scenario is modified to support the IFX 1.3.0 IFX Schema. Suppressing operations from a scenario is as simple as selecting them and pressing the "Delete" button on the computer keyboard.

If we had done an implementation of our scenario directly with a technology like Java, C#, or C, it would have taken a much longer time to identify which parts of the code would be impacted by the change of the input and output interface.

Service Validation

Service Validation goes beyond real-time computation of metadata. It explores the resulting metadata in each possible execution paths to check that it complies with the constraints of the output.

Formally, the input of an XML processing program such as a Web Service can be seen as a valid set of instance XML documents (input metadata). Same for the output (output metadata). Service validation consists in the following:

1) exploring every single branch of the program,
2) computing the set of valid XML documents produced for each branch (computed metadata for that branch), and
3) verifying that it ["it"=set of XML Docs] is "included" (in the set theory sense) into the set of expected XML documents in the output.

If it is included into the output metadata, the XML processing program is considered valid, since it is guaranteed to produce an XML output that conforms to the output metadata for each XML instance that conforms to the input metadata. The service validation is not a real-time functionality, as it requires a relatively large amount of computation power. It is invoked by the user from a menu item in the system. When the service/XML processing program is not valid, the system lists (see figure below) all the detected errors.

From there, the user is able to select an error in the list, and the system will automatically highlight in blue the execution path that is the source of the problem, and in red the operation, if any, that is the source of the problem.

The invention has been described in embodiments of systems and methods that make extensive use of metadata derived from XML Schema to prevent and detect errors in XML processing programs directly at design time. This unique feature enables to identify problems at development time instead of test time, and to reduce the amount of testing cases required. This ultimately decreases dramatically the costs of developing and maintaining message processing applications. It will be understood that these embodiments are mere examples, and that those skilled in the art will agree that other embodiments and obvious improvements are possible given the above disclosure, and that the scope of the invention is defined by the appended claims and their equivalents.

The invention claimed is:

1. A method for developing a processor-executable application comprising:
representing a processor-executable application comprising a plurality of application sub-programs;
representing a set of predetermined constraints associated with said processor-executable application;
receiving a development input for said processor-executable application;
validating said development input in real-time, wherein said validating comprises:
computing input and output constraints for one of said plurality of application sub-programs of said processor-executable application, wherein said one of said plurality of application sub-programs is associated with said development input;
analyzing an execution path of said processor-executable application, wherein said execution path is associated with said development input; and
verifying that said development input conforms with said set of predetermined constraints; and
providing a real-time notification based on said validating.

2. The method of claim 1, wherein said processor-executable application is a message oriented application.

3. The method of claim 2, wherein said message oriented application is an extensible markup language (XML) application.

4. The method of claim 1, wherein said processor-executable application corresponds to a user interface application.

5. The method of claim 4, wherein said user interface application is an automated teller machine application.

6. The method of claim 1, wherein said real-time notification comprises displaying an error associated with said development input.

7. The method of claim 1, wherein said validating further comprises preventing selection of a variable that does not conform to one or more of said computed input and output constraints at an application execution point.

8. The method of claim 7, further comprising inferring a data type from said application execution point.

9. The method of claim 8, further comprising basing subtyping of said data type on a description of said data type.

10. The method of claim 8, wherein said data type is an XML data type.

11. The method of claim 1, further comprising displaying a graphical representation of said processor-executable application.

12. A method for developing a processor-executable application, comprising:
providing a representation of said processor-executable application;
providing a representation of a predetermined constraint associated with said processor-executable application;
receiving a development input for one or more of a node and execution path of said processor-executable application;

validating said development input in real time based on one or more of said predetermined constraint and said representation of said processor-executable application, wherein said validating comprises computing input and output constraints associated with said development input; and providing a notification in real time based on a result of said validating.

13. The method of claim 12, wherein said processor-executable application is a message oriented application.

14. The method of claim 13, wherein said message oriented application is an extensible markup language (XML) application.

15. The method of claim 12, wherein said processor-executable application corresponds to a user interface application.

16. The method of claim 15, wherein said user interface application is an automated teller machine application.

17. The method of claim 12, wherein said real-time notification comprises displaying an error associated with said development input.

18. The method of claim 12, wherein said validating further comprises analyzing a selected execution point and corresponding processing execution paths of said processor-executable application.

19. The method of claim 12, wherein said validating further comprises preventing selection of a variable that does not conform to the predetermined constraint at an application execution point.

20. The method of claim 19, further comprising inferring a data type from said application execution point.

21. The method of claim 20, further comprising basing sub-typing of said data type on a description of said data type.

22. The method of claim 20, wherein said data type is an XML data type.

23. The method of claim 12, further comprising displaying a graphical representation of said processor-executable application.

24. The method of claim 12, wherein said processor-executable application comprises a plurality of application sub-programs.

25. A method for providing graphical representation of a processor-executable application, comprising:
 providing a graphical representation of said processor-executable application;
 providing a representation of a predetermined constraint associated with said processor-executable application;
 receiving a development input for one or more of a node and execution path of said graphical representation of a processor-executable application;
 validating said development input in real time based on one or more of said predetermined constraint and said representation of said processor-executable application, wherein said validating comprises computing input and output constraints associated with said development input;
 providing a notification in accordance with said validating; and
 updating said graphical representation based on said modification.

26. The method of claim 25, wherein said processor-executable application is a message oriented application.

27. The method of claim 26, wherein said message oriented application is an XML application.

28. The method of claim 25, wherein said processor-executable application corresponds to a user interface application.

29. The method of claim 28, wherein said user interface application is an automated teller machine application.

30. The method of claim 25, wherein said real-time notification comprises displaying an error associated with said input.

31. The method of claim 25, wherein said validating further comprises analyzing a selected execution point and corresponding processing execution paths of said processor-executable application.

32. The method of claim 25, wherein said validating further comprises preventing selection of a variable that does not conform to said predetermined constraint at an application execution point.

33. The method of claim 32, further comprising inferring a data type from said application execution point.

34. The method of claim 33, further comprising basing sub-typing of said data type on a description of said data type.

35. The method of claim 33, wherein said data type is an XML data type.

36. The method of claim 25, further comprising displaying said graphical representation.

37. The method of claim 25, wherein said processor-executable application comprises a plurality of application sub-programs.

38. A computer program product, comprising:
 a computer readable medium having computer executable program code to develop a processor-executable application when executed by a computer, said computer readable medium having:
 computer executable program code to represent a processor-executable application comprising a plurality of application sub-programs;
 computer executable program code to represent a set of predetermined constraints associated with said processor-executable application;
 computer executable program code to receive a development input for said processor-executable application;
 computer executable program code to validate said development input in real-time, wherein said computer executable program code to validate further comprises:
  computer executable program code to compute input and output constraints for one of said plurality of application sub-programs, wherein said one of said plurality of application sub-programs is associated with said development input;
  computer executable program code to analyze an execution path of said processor-executable application, wherein said execution path is associated with said development input;
  computer executable program code to verify that said development input conforms with said set of predetermined constraints; and
 computer executable program code to provide a real-time notification based on said computer executable program code to validate.

39. The computer program product of claim 38, wherein said processor-executable application is a message oriented application.

40. The computer program product of claim 39, wherein said message oriented application is an extensible markup language (XML) application.

41. The computer program product of claim 38, wherein said processor-executable application corresponds to a user interface application.

42. The computer program product of claim 41, wherein said user interface application is an automated teller machine application.

43. The computer program product of claim 38, wherein said real-time notification comprises displaying an error associated with said development input.

44. The computer program product of claim 38, wherein said computer executable program code to validate further comprises computer executable program code to prevent selection of a variable that does not conform to one or more of said computed input and output constraints at an application execution point.

45. The computer program product of claim 44, further comprising computer executable program code to infer a data type from said application execution point.

46. The computer program product of claim 45, further comprising basing sub-typing of said data type on a description of said data type.

47. The computer program product of claim 45, wherein said data type is an XML data type.

48. The computer program product of claim 38, further comprising computer executable program code to display a graphical representation of said processor-executable application.

49. A computer program product, comprising:
a computer readable medium having computer executable program code to develop a processor-executable application when executed by a computer, said computer readable medium having:
computer executable program code to providing a representation of said processor-executable application;
computer executable program code to provide a representation of a predetermined constraint associated with said processor-executable application;
computer executable program code to receive a development input for one or more of a node and execution path of said processor-executable application;
computer executable program code to validate said development input in real time based on one or more of said predetermined constraint and said representation of said processor-executable application, wherein said validating comprises computing input and output constraints associated with said development input; and
computer executable program code to provide a notification in real time based on a result of said computer executable program code to validate.

50. The computer program product of claim 49, wherein said processor-executable application is a message oriented application.

51. The computer program product of claim 50, wherein said message oriented application is an XML application.

52. The computer program product of claim 49, wherein said processor-executable application corresponds to a user interface application.

53. The computer program product of claim 52, wherein said user interface application is an automated teller machine application.

54. The computer program product of claim 49, wherein said real-time notification comprises displaying an error associated with said development input.

55. The computer program product of claim 49, wherein said computer executable program code to validate said processor-executable application further comprises computer executable program code to analyze a selected execution point and corresponding processing execution paths of said processor-executable application.

56. The computer program product of claim 49, wherein said computer executable program code to validate further comprises computer executable program code to prevent selection of a variable that does not conform to said predetermined constraint at an application execution point.

57. The computer program product of claim 56, further comprising computer executable program code to infer a data type from said application execution point.

58. The computer program product of claim 57, further comprising computer executable program code to base sub-typing of said data type on a description of said data type.

59. The computer program product of claim 57, wherein said data type is an XMIL data type.

60. The computer program product of claim 49, further comprising computer executable program code to display a graphical representation of said processor-executable application.

61. The computer program product of claim 49, wherein said processor-executable application comprises a plurality of application sub-programs.

62. A computer program product, comprising:
a computer readable medium having computer executable program code embodied therein to provide graphical representation of a processor-executable application when executed by a computer, said computer readable medium having:
computer executable program code to provide a graphical representation of said processor-executable application;
computer executable program code to provide a representation of a predetermined constraint associated with said processor-executable application;
computer executable program code to receive a modification for development input for one or more of a node and execution path of said graphical representation of a processor-executable application;
computer executable program code to validate said development input in real time based on one or more of said predetermined constraint and said representation of said processor-executable application, wherein said validating comprises computing input and output constraints associated with said development input;
computer executable program code to provide a notification in accordance with said computer executable program code to validate; and
computer executable program code to update said graphical representation based on said development input.

63. The computer program product of claim 62, wherein said processor-executable application is a message oriented application.

64. The computer program product of claim 63, wherein said message oriented application is an XML application.

65. The computer program product of claim 62, wherein said processor-executable application corresponds to a user interface application.

66. The computer program product of claim 65, wherein said user interface application is an automated teller machine application.

67. The computer program product of claim 62, wherein said real-time notification comprises displaying an error associated with said development input.

68. The computer program product of claim 62, wherein said computer executable program code to validate further comprises computer executable code to analyze a selected execution point and corresponding processing execution paths of said processor-executable application.

69. The computer program product of claim 62, wherein said validating further comprises computer executable code to prevent selection of a variable that does not conform said predetermined constraint at an application execution point.

70. The computer program product of claim 69, further comprising computer executable code to infer a data type from said application execution point.

71. The computer program product of claim 70, further comprising computer executable code to base sub-typing of said data type on a description of said data type.

72. The computer program product of claim 70, wherein said data type is an XML data type.

73. The computer program product of claim 62, further comprising computer executable code to display a graphical representation of said processor-executable application.

74. The computer program product of claim 62, wherein said processor-executable application comprises a plurality of application sub-programs.

75. A system for developing a processor-executable application, comprising:
 a module containing processor-executable instructions for developing said processor-executable application;
 a processor in communication with said module, said processor configured to execute said processor-executable instructions to:
  represent a processor-executable application comprising a plurality of application sub-programs;
  represent a set of predetermined constraints associated with said processor-executable application;
  receive a development input for said processor-executable application;
  validate said development input in real-time, wherein said processor-executable instructions to validate comprises:
   computing input and output constraints for one of said plurality of application sub-programs of said processor-executable application, wherein said one of said plurality of application sub-programs is associated with said development input;
   analyzing an execution path of said processor-executable application, wherein said execution path is associated with said development input; and
   verifying that said development input conforms with said set of predetermined constraints; and
  provide a real-time notification based on said validation.

76. The system of claim 75, wherein said processor-executable application is a message oriented application.

77. The system of claim 76, wherein said message oriented application is an extensible markup language (XML) application.

78. The system of claim 75, wherein said processor-executable application corresponds to a user interface application.

79. The system of claim 78, wherein said user interface application is an automated teller machine application.

80. The system of claim 75, wherein said real-time notification comprises displaying an error associated with said development input.

81. The system of claim 75, wherein said validating further comprises preventing selection of a variable that does not conform to one or more of said set of computed input and output constraints at an application execution point.

82. The system of claim 81, further comprising inferring a data type from said application execution point.

83. The system of claim 82, further comprising basing sub-typing of said data type on a description of said data type.

84. The system of claim 82, wherein said data type is an XML data type.

85. The system of claim 75, further comprising displaying a graphical representation of said processor-executable application.

86. A system for developing a processor-executable application, comprising:
 a module containing processor-executable instructions for developing said processor-executable application;
 a processor in communication with said module, said processor configured to execute said processor-executable instructions to:
  provide a representation of said processor-executable application;
  provide a representation of a predetermined constraint associated with said processor-executable application;
  receive a development input for one or more of a node and execution path of said processor-executable application;
  validate said development input in real time based on one or more of said predetermined constraint and said representation of said processor-executable application, wherein said validating comprises computing input and output constraints associated with said development input; and
  provide a notification in real time based on a result of said processor-executable instructions to validate.

87. The system of claim 86, wherein said processor-executable application is a message oriented application.

88. The system of claim 87, wherein said message oriented application is an extensible markup language (XML) application.

89. The system of claim 86, wherein said processor-executable application corresponds to a user interface application.

90. The system of claim 89, wherein said user interface application is an automated teller machine application.

91. The system of claim 86, wherein said processor-executable instruction to validate further comprises displaying an error associated with said development input.

92. The system of claim 86, wherein said processor-executable instructions to validate further comprises analyzing a selected execution point and corresponding processing execution paths of said processor-executable application.

93. The system of claim 86, wherein said processor-executable instructions to validate further comprises preventing selection of a variable that does not conform to said predetermined constraint at an application execution point.

94. The system of claim 93, further comprising processor-executable instructions to infer a data type from said selected application execution point.

95. The system of claim 94, further comprising processor-executable instructions to base sub-typing of said data type on a description of said data type.

96. The system of claim 94, wherein said data type is an XML data type.

97. The system of claim 86, further comprising processor-executable instructions to display a graphical representation of said processor-executable application.

98. The system of claim 86, wherein said processor-executable application comprises a plurality of application sub-programs.

99. A system for graphical representation of a processor-executable application, comprising:
 a module containing processor-executable instructions for providing a graphical representation of a processor-executable application;
 a processor in communication with said module, said processor configured to execute said processor-executable instructions to:
  provide a graphical representation of said processor-executable application;

provide a representation of a predetermined constraint associated with said processor-executable application;

receive a development input for one or more of a node and execution path of said graphical representation of a processor-executable application;

validate said development input in real time based on one or more of said predetermined constraint and said representation of said processor-executable application, wherein said validating comprises computing input and output constraints associated with said modification;

provide a notification in accordance with said validation; and update said graphical representation based on said development input.

100. The system of claim 99, wherein said processor-executable application is a message oriented application.

101. The system of claim 100, wherein said message oriented application is an extensible markup language (XML) application.

102. The system of claim 99, wherein said processor-executable application corresponds to a user interface application.

103. The system of claim 102, wherein said user interface application is an automated teller machine application.

104. The system of claim 99, wherein said processor-executable instruction to validate further comprises error detection of said processor-executable application.

105. The system of claim 99, wherein said processor-executable instructions to validate further comprises analyzing a selected execution point and corresponding processing execution paths of said processor-executable application.

106. The system of claim 99, wherein said processor-executable instructions to validate further comprises preventing selection of a variable that does not conform to said predetermined constraint at an application execution point.

107. The system of claim 106, further comprising processor-executable instructions to infer a data type from said selected application execution point.

108. The system of claim 107, further comprising processor-executable instructions to base sub-typing of said data type on a description of said data type.

109. The system of claim 108, wherein said data type is an XML data type.

110. The system of claim 99, further comprising processor-executable instructions to display a graphical representation of said processor-executable application.

111. The system of claim 99, wherein said processor-executable application comprises a plurality of application subprograms.

* * * * *